(12) United States Patent
Harley et al.

(10) Patent No.: US 10,400,789 B2
(45) Date of Patent: Sep. 3, 2019

(54) COMPRESSOR FOR AN EXHAUST GAS TURBOCHARGER

(71) Applicant: IHI CHARCHING SYSTEMS INTERNATIONAL GMBH, Heidelberg (DE)

(72) Inventors: Peter Harley, Heidelberg (DE); Andre Starke, Heidelberg (DE); Takahiro Bamba, Heidelberg (DE)

(73) Assignee: CHARGING SYSTEMS INTERNATIONAL GMBH, Heidelberg (DE)

( * ) Notice: Subject to any disclaimer, the term of this patent is extended or adjusted under 35 U.S.C. 154(b) by 275 days.

(21) Appl. No.: 15/466,933

(22) Filed: Mar. 23, 2017

(65) Prior Publication Data

US 2017/0191496 A1    Jul. 6, 2017

Related U.S. Application Data

(63) Continuation-in-part of application No. PCT/EP2015/002259, filed on Nov. 11, 2015.

(30) Foreign Application Priority Data

Nov. 25, 2014   (DE) .................. 10 2014 117 203

(51) Int. Cl.
*F04D 29/44*  (2006.01)
*F04D 27/02*  (2006.01)
(Continued)

(52) U.S. Cl.
CPC ............ *F04D 29/441* (2013.01); *F02B 37/00* (2013.01); *F04D 17/10* (2013.01); *F04D 25/04* (2013.01);
(Continued)

(58) Field of Classification Search
CPC .......... F02B 37/00; F04D 17/10; F04D 25/04; F04D 27/02; F04D 27/0215; F04D 29/42;
(Continued)

(56) References Cited

U.S. PATENT DOCUMENTS 4,212,585 A    7/1980   Swarden
4,781,530 A   11/1988   Lauterbach
(Continued)

FOREIGN PATENT DOCUMENTS

DE           100 29 808 C1    11/2001
DE     10 2008 039 285 A1     2/2010
(Continued)

*Primary Examiner* — John Kwon
*Assistant Examiner* — Johnny H Hoang
(74) *Attorney, Agent, or Firm* — Klaus J. Bach

(57) ABSTRACT

In a compressor, comprising a housing including a flow-through air guiding section with an inlet duct, a wheel chamber formed downstream of the inlet duct for accommodating a compressor wheel, and a spiral duct formed downstream of the wheel chamber, wherein flow slots are formed in a transition region connecting the inlet duct with the wheel chamber, and the transition region extends both in the directions of the inlet duct and of the wheel chamber along a leading edge of the compressor wheel, the flow slots each extend along an axial first length (L1) and along a radial length (RL) with a cross-section (Q), which cross-section (Q) changes over the axial first length (L1) of the flow slots.

4 Claims, 5 Drawing Sheets

(51) Int. Cl.
  *F04D 29/42* (2006.01)
  *F04D 29/68* (2006.01)
  *F02B 37/00* (2006.01)
  *F04D 17/10* (2006.01)
  *F04D 25/04* (2006.01)
  *F04D 29/28* (2006.01)

(52) U.S. Cl.
  CPC ....... *F04D 27/0215* (2013.01); *F04D 29/284* (2013.01); *F04D 29/4206* (2013.01); *F04D 29/4213* (2013.01); *F04D 29/685* (2013.01); *Y02T 10/144* (2013.01)

(58) Field of Classification Search
  CPC ............. F04D 29/4206; F04D 29/4213; F04D 29/284; F04D 29/44; F04D 29/441; F04D 29/685
  USPC ......................................................... 415/186
  See application file for complete search history.

(56) References Cited

U.S. PATENT DOCUMENTS 5,466,118 A * 11/1995 Heinrich ............. F04D 29/4213
                                                  415/208.3
2016/0281535 A1* 9/2016 Koehl ..................... F01D 25/04

FOREIGN PATENT DOCUMENTS

EP      0 614 014 A1   9/1994
EP      1 191 231 A2   3/2001

* cited by examiner

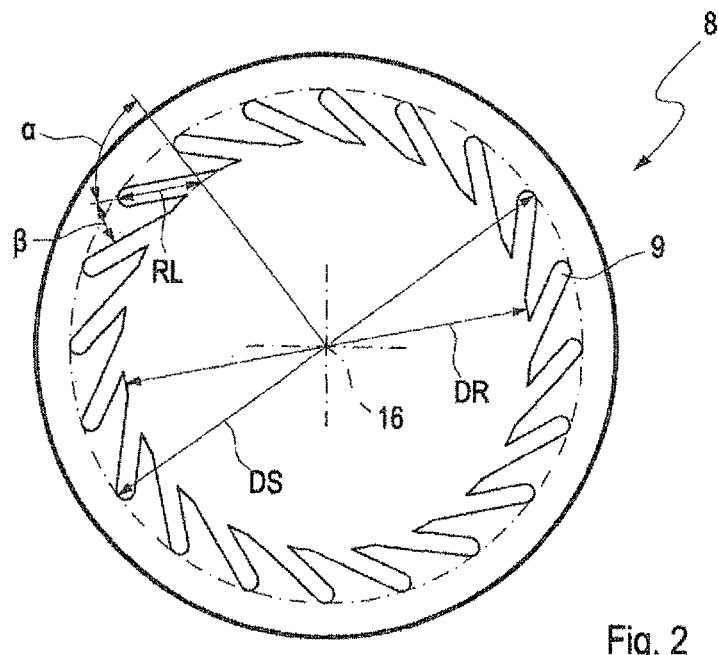
Fig. 2
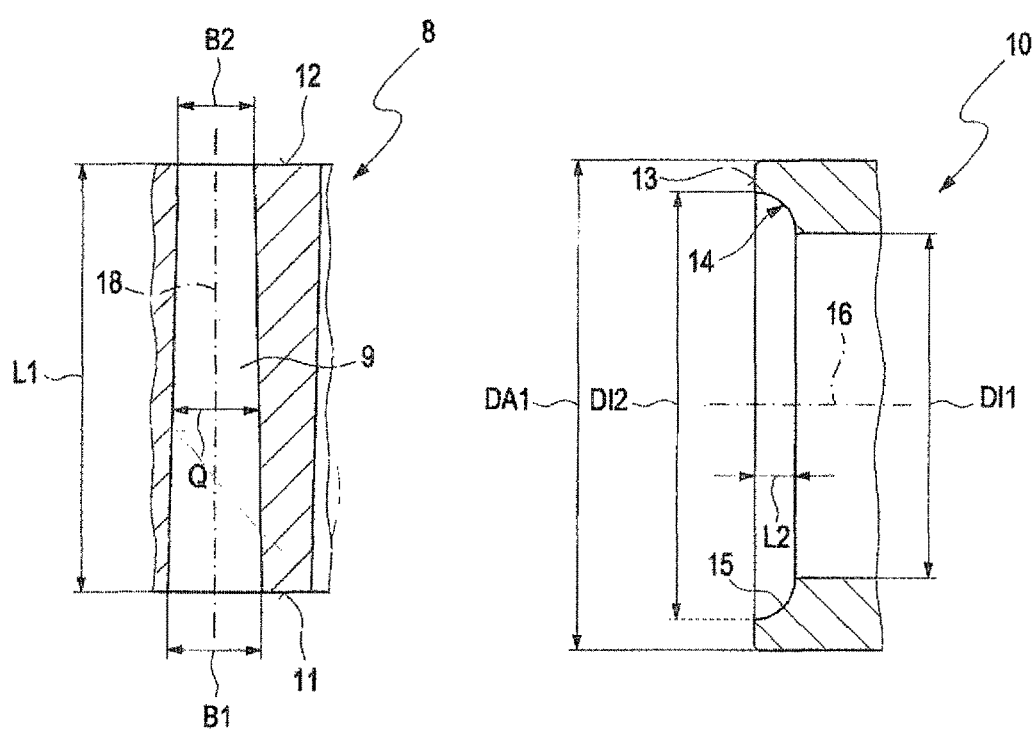
Fig. 3
Fig. 4

COMPRESSOR FOR AN EXHAUST GAS TURBOCHARGER

This is a Continuation-In-Part application of pending international Patent application PCT/EP2015/002259 filed Nov. 11, 2015 and claiming the priority of German patent application 10 2014 117 203.5 filed Nov. 25, 2014.

BACKGROUND OF THE INVENTION

The invention relates to a compressor for an exhaust gas turbocharger.

The operating range of compressors in exhaust gas turbochargers is defined by a surge limit and a choke limit which are identified by limit lines in a performance graph characterizing the compressor behavior. During operation of the compressor near the surge limit, locally limited stall zones may occur at the blades of the compressor wheel, which may result in pulsating of the flow with a periodic alternation of the flow direction. The surge limit of the compressor is reached when ever smaller volume flows are delivered through the compressor.

When, on the other hand, the operating point of the compressor is shifted to progressively higher volume flows in the compressor performance graph, the choke limit may be reached, which is characterized in that the flow volume at the wheel inlet is blocking the entrance to the compressor wheel.

For expanding the operating range of the compressor, performance stabilizing measures are known which shift both the surge limit and the choke limit so as to provide for an expanded operating range.

For example, U.S. Pat. No. 4,212,585 A shows a performance graph stabilizing measure according to which slots are formed in a casing of the compressor around a circumference of a compressor wheel inlet. The slots have a certain length, with a first end of the slots being positioned upstream of a compressor wheel leading edge and a second end of the slot being positioned downstream of the compressor wheel leading edge. In other words, the slots extend axially beyond the compressor wheel inlet edge.

European Patent Specification EP 0 614 014 B1 also discloses an arrangement of slots in the compressor casing, which slots are provided around the inlet of the compressor wheel. The slots are positioned upstream of a leading edge of the compressor wheel and are formed with a depth almost in parallel to the compressor wheel circumferential edge to improve their effect. This means, it is intended to obtain a slot beginning which is arranged slightly upstream of the compressor wheel circumferential edge.

It is the object of the present invention to provide an improved compressor for an exhaust gas turbocharger.

SUMMARY OF THE INVENTION

In a compressor comprising a housing including a flow-through air guide section with an inlet duct, a wheel chamber formed downstream of the inlet duct for accommodating a compressor wheel, and a spiral duct formed downstream of the wheel chamber, with flow slots formed in a transition region from the inlet duct to the wheel chamber, and the transition region extending both in the directions of the inlet duct and of the wheel chamber along a leading edge of the compressor wheel, the flow slots each extend along an axial first length (L1) and along a radial length (RL) with a cross-section (Q), and the cross-section (Q) changes over the axial first length (L1) of the flow slots.

Due to the changing cross-sections of the flow slots, the fluid dynamic behavior of a flow formed in the flow slots is changed compared to a constant cross-section over the first length, wherein a further improvement of the operating behavior of the compressor concerning its surge and choke limits can be achieved. Changing the flow slot geometry increases the maximum mass flow rate of the compressor wheel.

In an embodiment of the inventive compressor, the cross-section at an inlet opening of the flow slot facing the inlet duct has a first width, and a second width at an outlet opening of the flow slot facing the compressor wheel, with the first width being larger or smaller than the second width. In other words, the cross-sections of the flow slots are tapering or expanding in the axial direction towards the compressor wheel. In the case of a partial mass flow flowing through the flow slot from the wheel chamber into the inlet duct, in other words, of a partial mass flow flowing back, there is the advantage that a velocity decrease and, in particular, a pressure decrease depending on the direction of rotation of the compressor wheel can be achieved. Furthermore, it is advantageous during operation of the compressor in a region remote from the surge limit that the partial mass flow flowing through the flow slots experiences an additional advantageous velocity and pressure increase.

Another advantage is to be seen in the manufacturability of the compressor. Because of the conicity of the flow slots, a casing section of the compressor may be economically manufactured in a die casting method. Depending on the configuration of the casing section, it is to be formed in one or in multiple parts.

A conicity of the flow slots in the axial direction relative to the slot axis of the flow slot ranging from 0.5° to 10° has proven to be especially advantageous.

For a simple and economic manufacture of the air guiding section and the flow slots, an insert ring is provided which comprises the flow slots and is to be inserted into the inlet duct. Thus, the insert ring may be manufactured separately from the air guiding section. Due to the conicity of the flow slots, the insert ring may be economically manufactured by a die casting method.

The inventive compressor shows an improved operation behavior both at low pressure ratios and at high pressure ratios, wherein as a whole, a broadening of a compressor performance group along a mass flow rate of the compressor due to a shift of the surge limit can be achieved.

Efficiencies of the compressor may be increased over the entire compressor performance graph so that, in combination of the compressor with an internal combustion engine, a reduced consumption of the internal combustion engine is achievable.

The invention as well as advantages, features and details of the invention will be explained in the following description of preferred exemplary embodiments with reference to the accompanying drawing. The above mentioned features and feature combinations in the description as well as the following features and feature combinations in the description of the figures and shown in the figures are not only applicable in the indicated combination but also in other combinations or alone, without deviating from the scope of the invention.

BRIEF DESCRIPTION OF THE DRAWINGS

FIG. 2 shows a side view of the insert ring of the inventive compressor according to FIG. 1, FIG. 3 shows a sectional view of a flow slot of the insert ring according to FIG. 2, FIG. 4 shows a part of the support sleeve according to FIG. 1 in a sectional view.

DESCRIPTION OF A PARTICULAR EMBODIMENT

Figure 1:
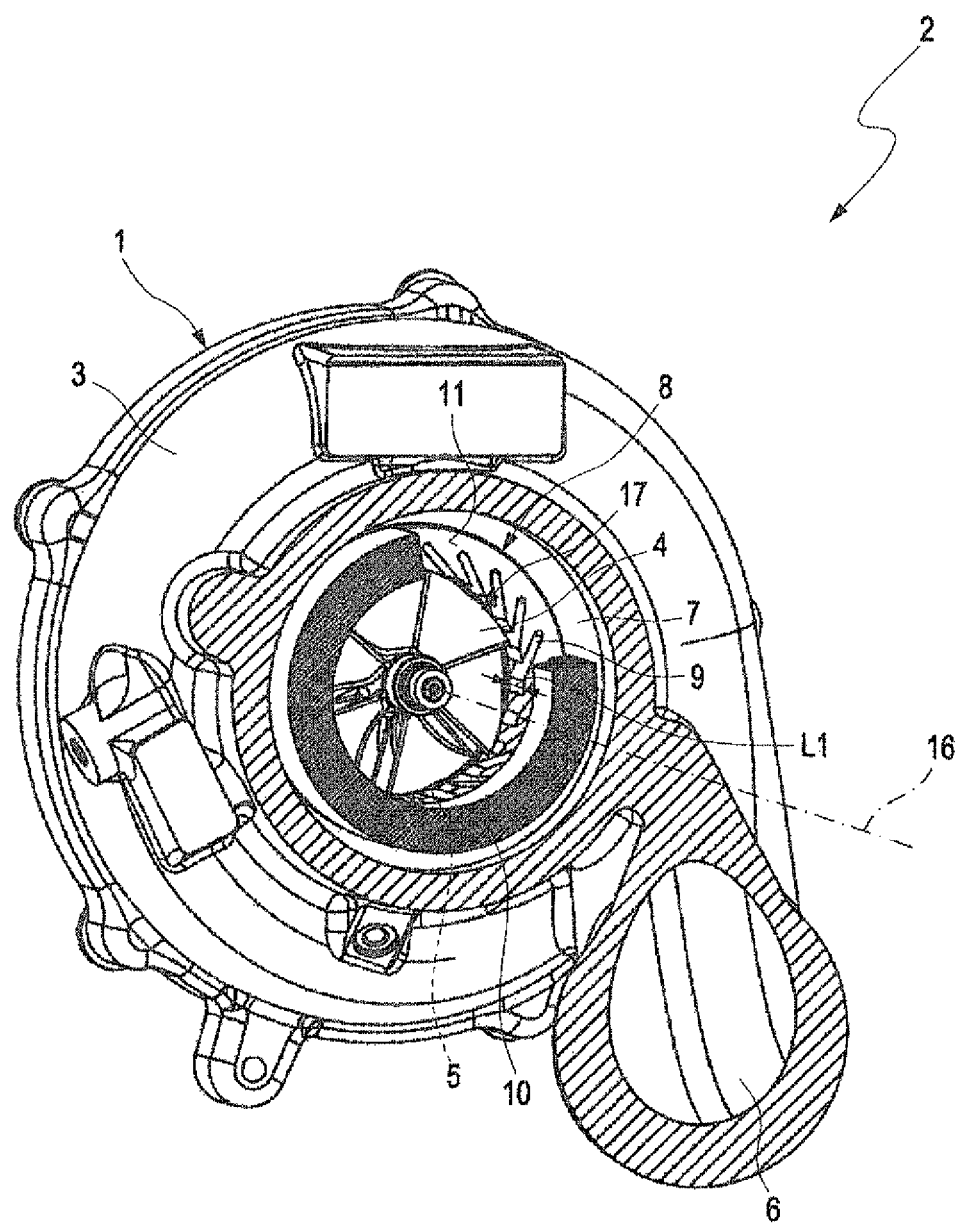
FIG. 1 shows a perspective view of an inventive compressor in a partial sectional view with an insert ring and a support sleeve in a first exemplary embodiment.

An inventive compressor 1 of an exhaust gas turbocharger 2 is implemented in a first exemplary embodiment according to FIG. 1. The compressor 1 comprises a casing section 3 which is configured as a flow-through air guiding section through which a fluid, generally fresh air, is flowing during operation of the exhaust gas turbocharger 2. Generally, the fresh air serves for the combustion of fuel in an internal combustion engine (not shown in detail).

The exhaust gas turbocharger 2 is associated with another casing section (not shown in detail) configured as a bearing section supporting a rotor 17 of the exhaust gas turbocharger 2. The bearing section is positioned between a flow-through exhaust gas guiding section (not shown in detail) of the exhaust gas turbocharger 2 and the air guiding section 3.

The rotor 17 comprises a compressor wheel 4 and a turbine wheel (not shown in detail), which are connected to each other by means of a shaft (not shown in detail). The compressor wheel 4 is positioned in a wheel chamber 5 of the air guide section 3 for sucking in generally fresh air. The turbine wheel (not shown in detail) is rotatably accommodated in another wheel chamber (not shown in detail) of the exhaust gas guide section.

During operation of the exhaust gas turbocharger 2, the turbine wheel is subjected to, and driven by, the exhaust gas flowing through the exhaust gas guiding section so that it may perform a rotary motion about an axis of rotation 16 of the rotor 17. This rotary motion is transferred to the compressor wheel 4 by the shaft, which rotates with the turbine wheel. By rotation of the compressor wheel 4, fresh air is sucked in which is compressed in the air guide section 3.

The air guide section 3 comprises a flow-through spiral duct 6 downstream of the compressor wheel chamber 5, via which the fluid is supplied to the internal combustion engine. An inlet duct 7 of the air guide section 3 is formed upstream of the compressor wheel chamber 5, via which fresh air is supplied to the compressor wheel 4.

An insert ring 8 is disposed concentrically to the compressor wheel 4 in the inlet duct 7 so that the insert ring 8 radially encloses the compressor wheel 4. Flow slots 9 are provided in the insert ring 8, via which an essentially coaxial supply of air to the compressor wheel 4 may be obtained. The flow slots 9 in the insert ring 8 form a bypass duct to the compressor wheel 4, via which an extension of the operating range of the compressor 1 between the surge limit and the choke limit may be realized.

A partial mass flow of the sucked in fresh air may be branched off, returned and reintroduced into a main mass flow through the air guide section 3 via the flow slots 9 in the insert ring 8 which extend axially and radially in the circumferential direction. During operation in the region of the choke limit, the partial mass flow is guided axially through the flow slots 9 of the insert ring 8, but in the same direction as a main mass flow of the fresh air flow into the inlet duct 7.

The insert ring 8 is fixed in the inlet duct 7 by means of a support sleeve 10. Besides its support function, the support sleeve 10 has a flow guiding function, as will be explained later.

FIG. 2 shows the insert ring 8 in a side view. The insert ring 8 is constructed as a single piece and comprises a plurality of evenly distributed flow slots 9 around the circumference, which are arranged in the insert ring 8 under a defined first angle cc relative to the radial extension as well as under a defined second angle β relative to the circumferential direction, and which, in particular, extend over the entire axial first length L1 of the insert ring 8. The orientation of the flow slots 9 in the insert ring 8 inclined relative to the circumferential direction is advantageous in that the flow slots 9 with a given wall thickness of the insert ring 8 may have a larger cross-sectional area than this would be the case in an exclusively radial extension of the flow slots 9. Therefore, the insert ring 8 exhibits a ring section for a partial flow-through ring section with a ring diameter DS which is larger than a free ring diameter DR of the insert ring 8.

Each flow slot 9 has a first width B1 and a second width B2, wherein the first width B1 is positioned at a first ring surface 11 facing away from the compressor wheel 4, and the second width B2 is positioned at a second ring surface 12 facing towards the compressor wheel 4.

Thus, the cross-section Q of each flow slot 9, starting from the first ring surface 11 to the second ring surface 12, is narrowing along its axial first length L1, see FIG. 3. Preferably, this narrowing or conicity, respectively, of the flow slot 9 in its axial extension in relation to a slot axis 18 has a cone angle of 0.5° to 10°.

FIG. 4 shows a cut-out of the support sleeve 10 in a longitudinal section, wherein the cut-out illustrates a region facing the insert ring E. The support sleeve 10 is formed as a hollow cylinder and has a first inner diameter DI1 and an outer diameter DA1. At its end face 13 facing the insert ring 8, it has a second inner diameter DI2 which is larger than the first inner diameter DI1. The second inner diameter DI2 corresponds to the ring diameter DS, see FIG. 2. Preferably, the second inner diameter DI2 is 1.06 to 1.13 times the ring diameter DR. Preferably, the first inner diameter DI1 is 0.9 to 1.1 times the free ring diameter DR.

Starting from the second inner diameter DI2, the inner diameter DI of the support sleeve 10 becomes smaller along a second axial length L2 until the inner diameter DI corresponds to the first inner diameter DI1. This ensures that in case of a return flow, the partial mass flow may completely flow out of the flow slot 9 along an entire radial length RL of the flow slot 9, because inlet surfaces formed on the first ring surface 11 of the flow slots 9 are not directly covered by the support sleeve 10.

Due to the decreasing inner diameter DI, the returning partial mass flow may axially return, however, only along the second length L2, because an inner wall of the support sleeve 10 constitutes a flow resistance along the radial length RL. Thus, the support sleeve 10 comprises a flow guiding element 14.

In order to prevent flow separation, the flow guide element 14 comprises a contour 15 which is rounded in the axial direction. Very good flow properties may be achieved with a second length L2 which amounts to 0.07 to 0.27 times the free ring diameter DR. The rounded contour 15 is preferably to be provided with a radius between 0.07 and 0.13 relative to the free ring diameter DR.

Figure 5:
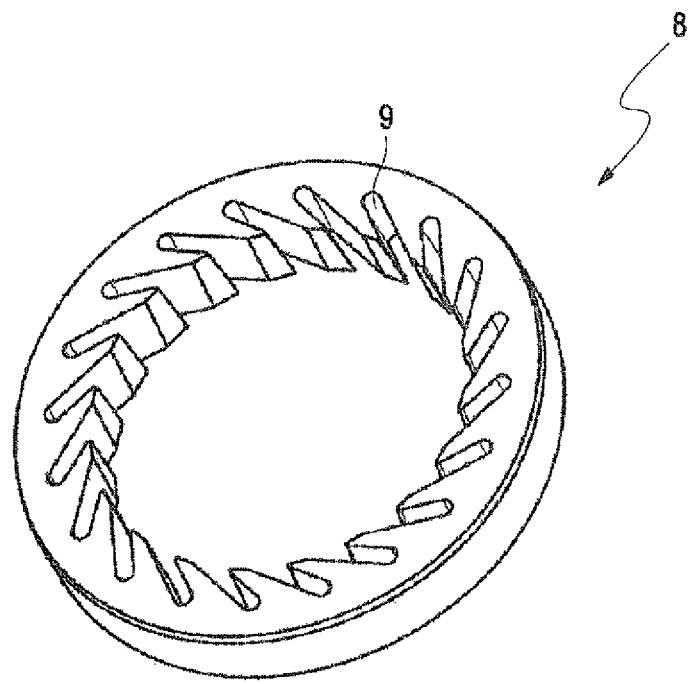
FIG. 5 shows a perspective view of the insert ring according to FIG. 2.

FIG. 5 is a perspective view of the inventive insert ring 8 according to FIGS. 1 to 3.

Figure 6:
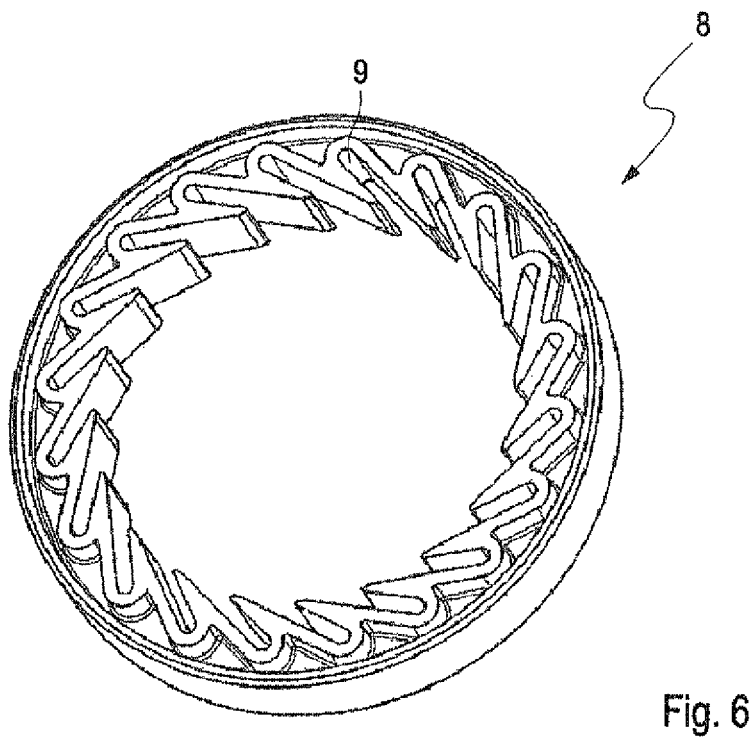
FIG. 6 shows a perspective view of the insert ring of the inventive compressor in a second exemplary embodiment.

FIG. 6 illustrates the insert ring 8 according to a second exemplary embodiment. The insert ring 8 is economically manufactured in an aluminum die casting method. The insert ring 8 may, for example, also be made from a synthetic material in an injection molding method.

Figure 7:
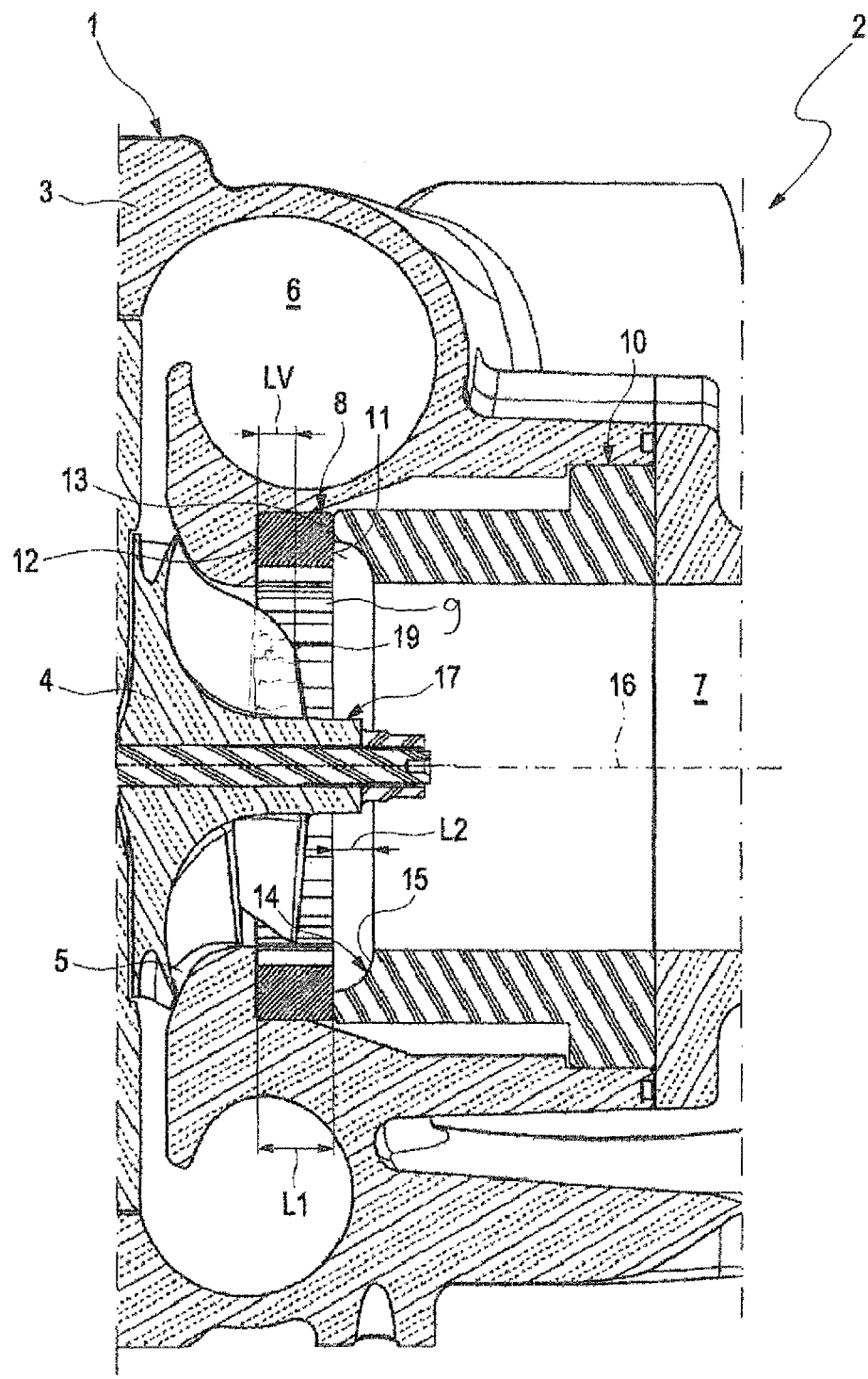
FIG. 7 shows a longitudinal section through the compressor according to FIG. 1.

FIG. 7 shows the compressor 1 in a longitudinal cross-section, comprising the insert ring 8 with the support sleeve 10. The insert ring 8 is positioned concentrically with the compressor wheel 4, wherein the insert ring 8 is arranged in such a manner that it does not completely encompass the compressor wheel 4 in the region of a compressor wheel leading edge 19 over the axial first length L1.

For securing the insert ring 8 and for supporting or fixing it, respectively, in the inlet duct 7, the support sleeve 10 is positioned in the inlet duct 7. An end face 13 of the support sleeve 10 facing the first ring surface 11 is disposed at the first ring surface 11 contacting it.

The flow slots 9 in their axial extension relative to the compressor wheel leading edge 19 are so positioned that an axial overlap length LV amounting to 0.5 times the first length L1 is formed. In other words, the flow slots 9 encompass the compressor wheel 4 with one half of their axial first length L1. Overlap lengths which amount to 0.1 to 0.8 times the first length L1 downstream of the compressor wheel leading edge 19 have proven adequate for an operating range of the compressor.

Figure 8:
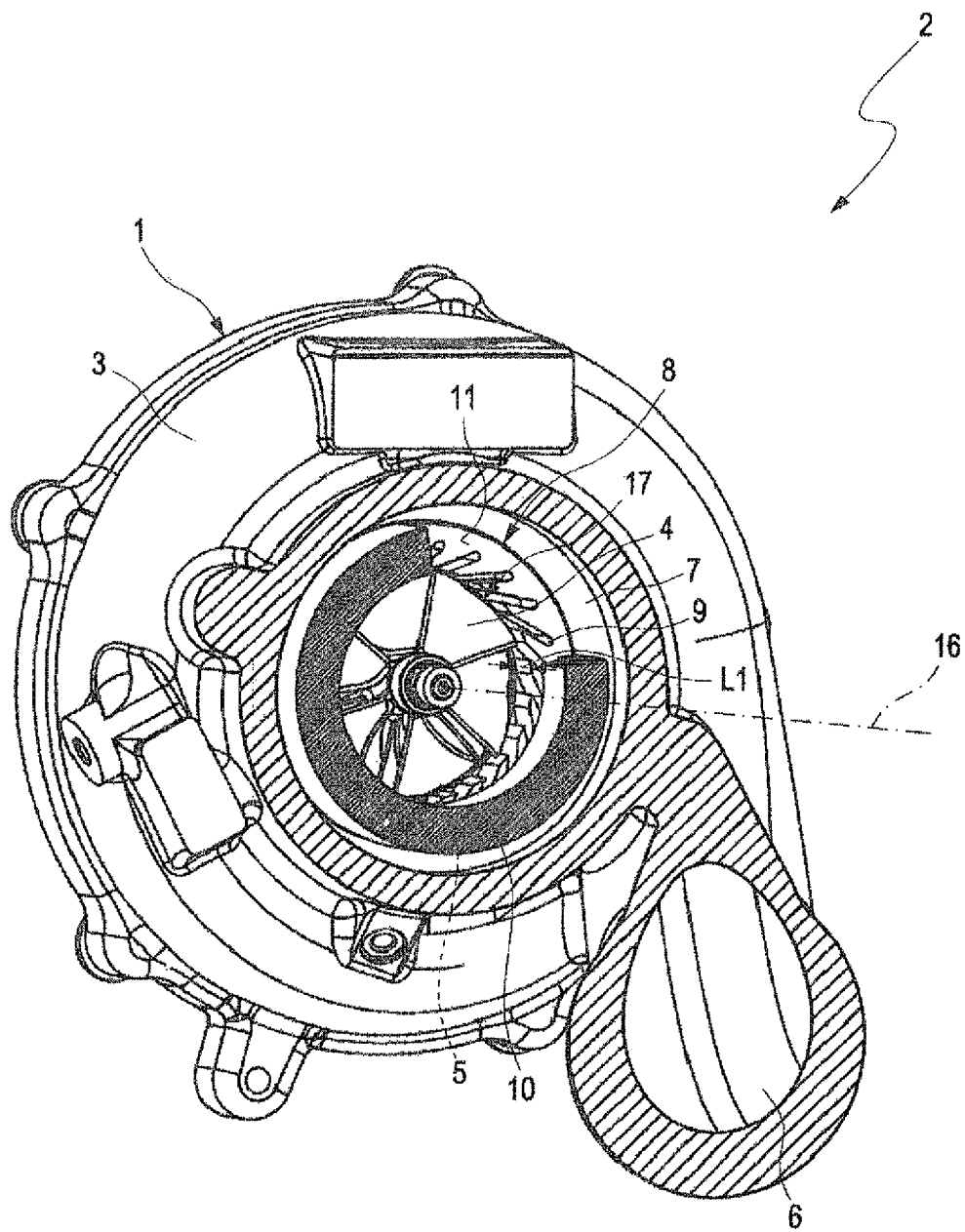
FIG. 8 shows a perspective view of the inventive compressor in a partial sectional view with the insert ring and the support sleeve in a third exemplary embodiment.

FIG. 8 shows the insert ring 8 in a third exemplary embodiment, wherein the flow slots 9 are inclined in the radial direction, opposite to the first exemplary embodiment. Depending on the requirements and the desired operation behavior of an internal combustion engine which is connected with the exhaust gas turbocharger 2, e. g. for a reduction in consumption, an inclination of the flow slots 9 opposite to the direction of rotation of the compressor wheel 4 is preferred, while for a significant shift of a surge limit of the compressor 1, an inclination of the flow slots 9 in the direction of rotation of the compressor 1 is preferred.

The invention claimed is:

1. A compressor comprising a housing with a flow-through air guide section (3) with an inlet duct (7), the compressor housing including: a wheel chamber (5) formed downstream of the inlet duct (7) for accommodating a compressor wheel (4), a spiral duct (6) formed downstream of the wheel chamber (5), with flow slots (9) formed in a transition region between the inlet duct (7) and the wheel chamber (5), and with the transition region extending both in the directions of the inlet duct (7) and of the wheel chamber (5) along a leading edge of the compressor wheel 4 (4), and the flow slots (9) each extending along an axial length (L1) and having a certain radial depth (RL) and a flow width (Q), which changes over the axial length (L1) of the flow slots (9) from a first width (B1) at the end which faces the inlet duct (7) to a second width (B2) at an opening of the slot (9) facing the compressor wheel (4), wherein the first width (B1) is larger than the second width (B2) facing the compressor wheel (4).

2. The compressor according to claim 1, wherein the flow slots (9) exhibit a conicity ranging from 0.5° to 10° in the axial direction relative to a slot axis (18) of the flow slots (9).

3. The compressor according to claim 1, wherein the flow slots (9) are formed in an insert ring (8) which is inserted into the inlet duct (7) and the insert ring (8) is fixed in the air guide section (3) by locking sleeve (10) which is in contact with the insert ring (8) and is provided with a flow guide structure (14) at its end which faces the insert ring (8) thereby forming an annular slot between the locking device (10) and the insert ring (8) in communication with the flow slots (9) for smoothly returning recirculated gas from the flow slots (9) to the end of the slots (9) at the annular slot formed by the flow guide structure (14).

4. The compressor according to claim 1, wherein the flow slots (9) in their axial extension relative to a leading edge (19) of the compressor wheel (4) are so positioned that a value of an axial overlap length (LV) of the flow slots (9) downstream of the compressor wheel leading edge (19) is within a range of 0.1 to 0.8 times the axial length (L1) of the flow slots (9).

* * * * *

UNITED STATES PATENT AND TRADEMARK OFFICE
CERTIFICATE OF CORRECTION

PATENT NO. : 10,400,789 B2
APPLICATION NO. : 15/466933
DATED : September 3, 2019
INVENTOR(S) : Harley et al.

Page 1 of 1

It is certified that error appears in the above-identified patent and that said Letters Patent is hereby corrected as shown below:

On the Title Page

Please change:
"(71) Applicant: IHI CHARCHING SYSTEMS INTERNATIONAL GMBH, Heidelberg (DE)"
To:
--(71) Applicant: IHI CHARGING SYSTEMS INTERNATIONAL GMBH, Heidelberg (DE)--

Signed and Sealed this
Twenty-first Day of April, 2020

Andrei Iancu
*Director of the United States Patent and Trademark Office*